Sept. 1, 1953  R. E. RISLEY  2,650,840
LARGE DIAMETER COUPLING.
Filed Aug. 3, 1948  2 Sheets-Sheet 1
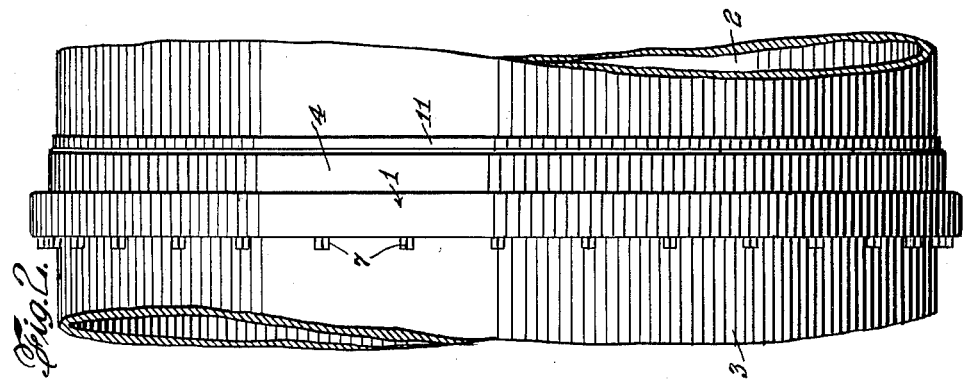
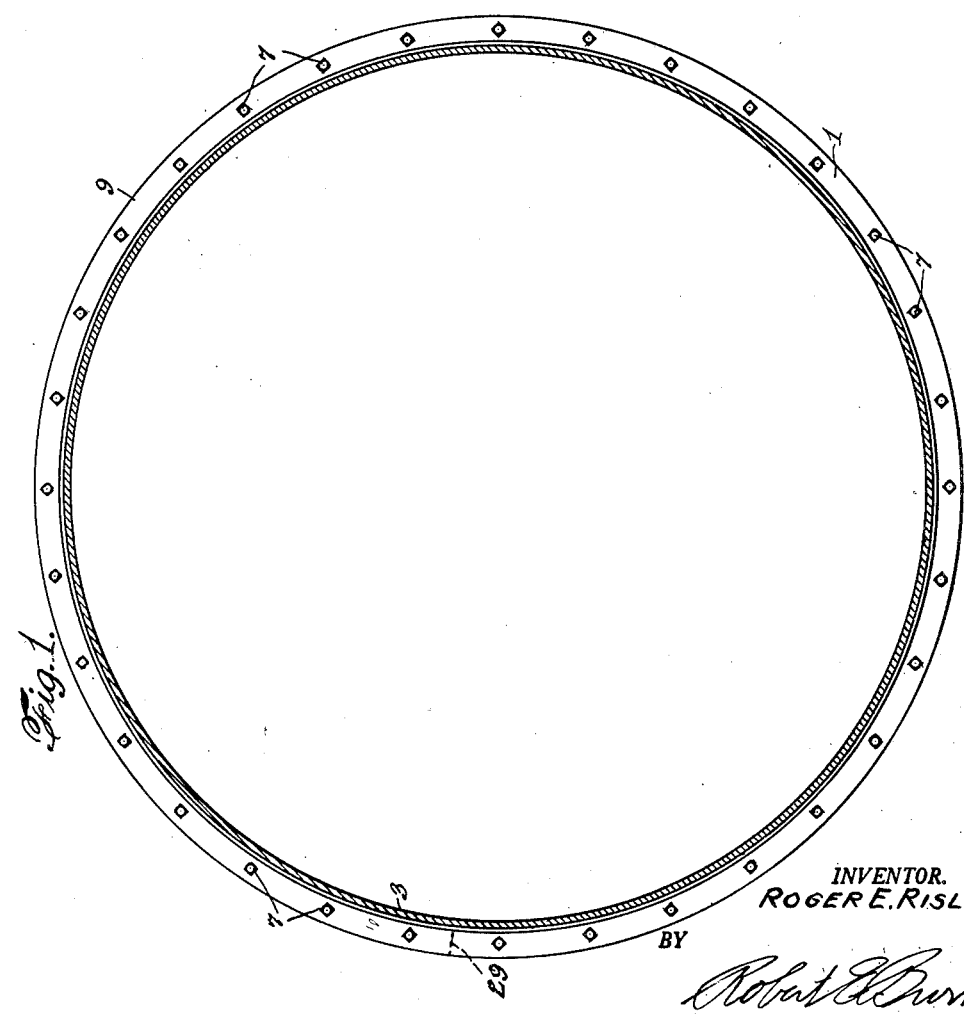
INVENTOR.
ROGER E. RISLEY
BY
ATTORNEY.

Sept. 1, 1953  R. E. RISLEY  2,650,840
LARGE DIAMETER COUPLING
Filed Aug. 3, 1948  2 Sheets-Sheet 2
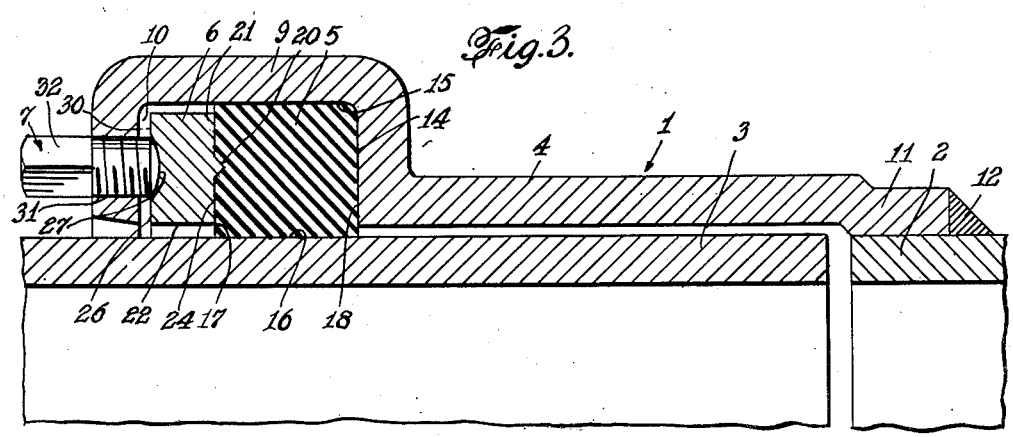
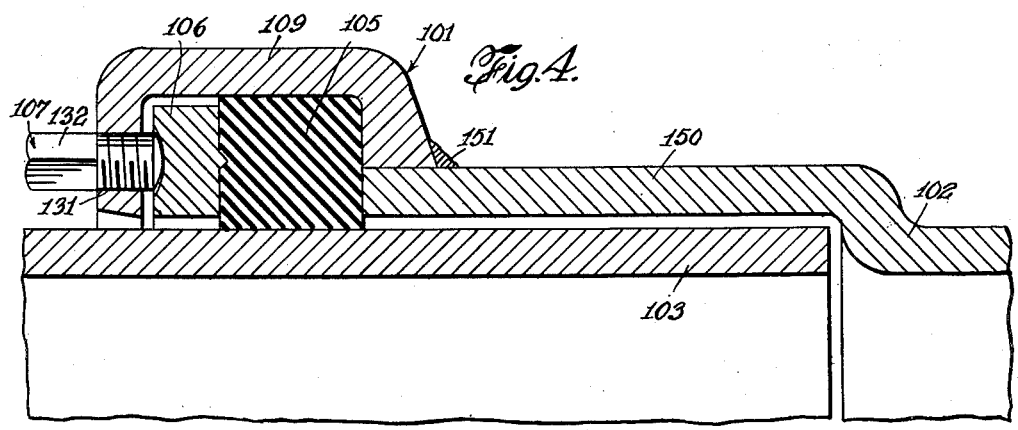
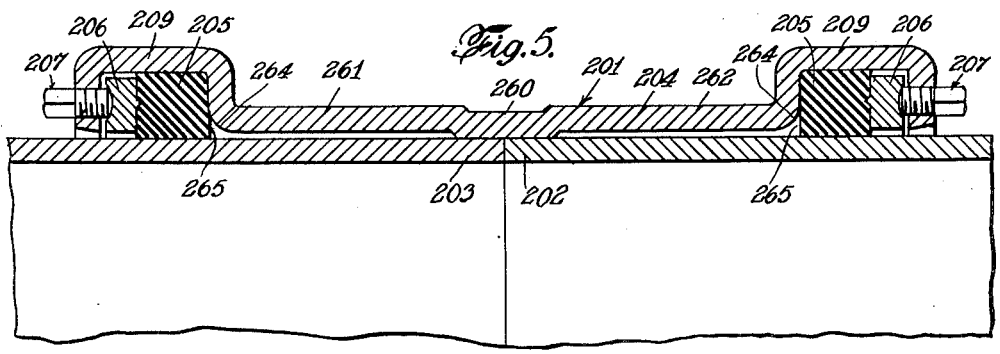
INVENTOR.
ROGER E. RISLEY
BY
ATTORNEY Patented Sept. 1, 1953

2,650,840

UNITED STATES PATENT OFFICE 2,650,840

LARGE DIAMETER COUPLING

Roger E. Risley, Bradford, Pa., assignor to Dresser Industries, Inc., Cleveland, Ohio, a corporation of Pennsylvania Application August 3, 1948, Serial No. 42,219

5 Claims. (Cl. 285—165)

The present invention relates to gasket sealed pipe couplings for pipe sections having plain or unthreaded ends.

As generally constructed, such couplings usually comprise a sleeve or middle ring provided at one or both ends with a packing recess, a gasket or packing ring in the recess, a follower or clamping ring for engaging the gasket and forcing it into engagement with the pipe section and the packing recess of the sleeve, and bolts for drawing the follower ring toward the sleeve to apply pressure to the gasket. The bolts may be a series of short bolts connecting the clamping ring with an outwardly projecting flange of the sleeve to hold the gasket in tight sealing relationship with the pipe section and the sleeve. It is necessary that the clamping ring shall have portions extending considerably outside of the periphery of the packing recess and provided with holes to receive the bolts. Thus in such clamps, in order to apply adequate sealing pressure to the gasket, the bolt stress is exerted at considerable distance radially from the outer surfaces of the pipe section and a severe turning moment is imposed on the clamping ring which must be strong enough to resist this turning moment.

Furthermore, any arrangement in which the clamping bolts pass through the gasket has an inherent disadvantage in that the bolts tend to inhibit the flow of the gasket under compression, particularly in a radial inward direction. This defect is particularly critical in cases where the gasket must be made larger than the pipe on which it is to be used for the purpose of allowing the joint to be preassembled for a stab fit in the field. Due to the relative inefficiency of this type of coupling, particularly with respect to the gasket flow characteristics, a greater number of bolts must be used than in the conventional bolted mechanical coupling in which the clamping bolts are outside of the gasket.

In such couplings, it has been found that the volume of gasket on both sides of the bolt must be substantially equal for uniform results, and there must be a substantial radial distance between the bolt shank and the parallel confining surfaces of the joint and pipe. Thus the radial width of the gasket necessarily becomes greater, resulting in an increased gasket area to receive the clamping pressure of the follower rings. With this increased area only relatively low unit gasket pressures can be developed without the use of still more oversized bolts or a still greater number of bolts, adding to the weight and expense of manufacture of the coupling.

The present invention aims to overcome the foregoing difficulties and disadvantages by providing a coupling in which the bolts extend through the edge of the coupling member to urge the follower ring against the gasket to provide a tight seal.

Another object of the invention is to provide a pipe coupling which is simple and economical to manufacture, efficient in operation and durable in use.

These objects are accomplished by providing a pipe coupling in which the bolts extend through threaded apertures in the outer edge of the coupling to clamp the gasket between a follower ring and a gasket which are placed in a recess provided by forming the edge of the coupling with a shape having a channel cross section. In one form of the invention, the coupling is attached to the pipe by a welded connection. This construction is advantageous in that it may be assembled and attached to one end of a plain end pipe in the factory. In another form of the invention, the coupling is used to connect two meeting pipe ends without the use of the welded connection.

The construction in accordance with the invention is advantageous in that the gasket is protected against the deleterious effects of contact with foreign matter, and furthermore, the portion of the bolt under stress is entirely enclosed within the coupling and is thereby protected against corrosion and electrolytic action.

Other objects and advantages of the invention will be apparent from the following description and from the accompanying drawings which show, by way of examples, three embodiments of the invention.

In the drawings:

Fig. 1 is an end view of a coupling in accordance with the invention in position on a pipe, the pipe being shown in section.

Fig. 2 is a side view of the coupling shown in Fig. 1.

Fig. 3 is an enlarged partial longitudinal sectional view of the coupling showing one end welded to a pipe having a plain end.

Fig. 4 is an enlarged partial longitudinal sectional view of another embodiment of the coupling in accordance with the invention in which the pipe is formed with an enlarged end, the coupling member being thereafter welded to the end of the pipe.

Fig. 5 is an enlarged partial longitudinal sectional view of another embodiment of the coupling in accordance with the invention in which the coupling is modified for connecting the meeting ends of a pair of plain end pipe sections.

Referring to the embodiment of the invention illustrated in Figs. 1–3 inclusive, a coupling 1 is shown attached to an end of a pipe 2 connecting it to the meeting end of an adjacent plain end pipe 3.

The coupling 1 includes a sleeve or collar 4, a gasket or packing ring 5, a follower or clamping ring 6, and a plurality of bolts 7 threadedly engaged in an inwardly projecting flange forming the outer side of an annular end 9 of channel cross section provided at the outer end of the sleeve 4 and forming an inwardly facing recess for the follower ring and gasket.

The ring or sleeve 4 is of slightly greater diameter than the pipe sections with which it is to be used so that the pipe section may be stabbed into its open end without binding on the inner surface thereof and so that the coupling 1 may be made up even though the pipe sections are not in perfect alignment, or the pipe wall is irregular or has a roughened surface.

In the embodiment of the invention shown in Figures 1–3, the coupling 1 is shown as attached at one end 11 to the end of the pipe section 2 by a welded joint 12. To facilitate the welding operation, the inner end 11 of the ring 4 is made with a somewhat smaller diameter than the remainder of the coupling in order that it will fit tightly in position on the end of the pipe 2. The outer end of the middle ring 4 is formed with a channel to provide the inwardly facing gasket recess 10. The inner wall of the recess, as indicated at 14, is formed with a plane gasket engaging surface substantially perpendicular to the axis of the coupling.

The gasket or packing ring 5 is formed preferably of rubber or other suitable composition molded in ring form, or alternatively, the gasket may be made in the form of a strip provided with beveled overlapping edges which may be placed together to form a ring when the gasket is in position in the coupling. As may be seen in Fig. 3, the packing ring or gasket 5 has a cylindrical outer surface 15, an inner-cylindrical face 16 and straight side walls 17 and 18. The inner diameter of the gasket ring 5 is preferably slightly greater than the exterior diameter of the pipe section 3 with which the coupling is to be used in order that a stab fit may be made without damaging the inner surface of the coupling.

The follower ring 6 is adapted to press the gasket 5 against the walls 14 and 15 and against the outer surface of the pipe end 3. To facilitate insertion into the channel or recess 10, the ring 6 is made split or sectional. The side wall 17 of the gasket 5 is provided with an annular groove 20 for a purpose which will be described later. The follower ring has a cylindrical outer surface 21 and a cylindrical inner surface 22, the inner side 24 of the ring being provided with an annular projection preferably of V cross sectional shape, adapted to fit within the groove 20 of the gasket 5. The outer side 26 of the follower ring is formed with an annular bolt-end receiving recess 27. The annular recess 27 extends around the ring 6 but preferably stops short of a square split 29 in the ring which is shown in dotted lines in Fig. 1. The follower ring 6 is adapted to be positioned so that the split 29 occurs between two adjacent bolts 7. By terminating the annular recess 27 at a distance from the split 29, means is provided for approximately centering the split between two adjacent bolts. The follower ring 6 is made sufficiently strong to withstand the load of the compression of the gasket under the stress of the tightening of the bolts without substantial deformation.

The bolts 7 are made of a length to extend through edge 30 of the coupling ring which is apertured and threaded at 31 to receive the bolts. Heads 32 of the bolts 7 are formed to receive a wrench.

The coupling is preferably assembled at the factory by welding the sleeve 4 to one end of a pipe section, inserting the gasket 5 and follower ring 6 in the channel at the outer end of the sleeve and screwing the bolts 7 into the threaded holes 31 of the flange 30. In joining two sections of pipe in the field, the plain end of one pipe section 3 is stabbed into the coupling 1 provided on the second section and the bolts 7 are tightened so that the follower ring 6 crowds the gasket 5 against the walls 14 and 15 of the gasket recess and against the outer surface of the pipe 3 to apply sealing pressure to the gasket.

Another embodiment of the invention is illustrated in Fig. 4 in which corresponding parts are designated by the same reference numerals as in Figures 1–3 with the addition of 100. In Fig. 4 there is shown a coupling 101 adapted to connect the meeting ends 102 and 103 of a pair of pipe sections. This coupling differs from that previously described in that the outer end of pipe 102 is expanded as indicated at 150 to receive the end of pipe 103. The annular member 109 of channel cross section is welded as indicated at 151 to the expanded or bell end 150 of the pipe 102. This coupling is advantageous in that it may be adapted for use with existing pipe sections having an enlarged end 150.

A further embodiment of the invention is illustrated in Fig. 5 in which corresponding parts are designated by the same reference numerals as in Figures 1–3 with the addition of 200. In Fig. 5 there is shown a coupling 201 adapted to connect the meeting ends 202 and 203 of a pair of plain end pipe sections. This coupling differs from those previously described in that similar gasket recesses are provided at both ends of the sleeve 204 so that the coupling is suitable for connecting two plain end pipes. The central portion 260 of the sleeve or middle ring 204 is made of a somewhat smaller diameter corresponding approximately to the outside diameter of the end 11 of the coupling of Figures 1 to 3. Intermediate portions 261 and 262 of the coupling are formed somewhat similarly as in the embodiment previously described, the diameter of these portions of the coupling being somewhat greater than the diameter of the pipe in order to make provision for the use of the coupling on pipe ends which are not in perfect alignment with each other. At the outer end of each of the intermediate sections 261 and 262 there is provided a channel 209. At the junction of the intermediate portion 261, 262 with the channel portion 209, the inside corner is preferably rounded or bevelled as indicated at 264 to form an inclined surface adapted to crowd the adjacent portion 265 of the gasket in against the pipe. The follower rings 206 and the bolts 207 are as previously described in connection with the description of the other embodiments of the invention. While the coupling 201 is particularly adaptable for connecting the ends of plain ended pipe sections, it also may be used as a repair unit to be slipped over a pipe so that the defective portion of the pipe is included between the gasket members.

While the invention has been described and illustrated with reference to a specific embodiment thereof, it will be understood that other embodiments may be resorted to without departing from the invention. For example, the first two embodiments of the invention may be provided with inwardly beveled edges corresponding to the edges 26a of Fig. 5 to provide an extension of the gasket recess. Further, while the couplings are shown as attached in Figures 1–4 to the pipe ends by means of welded joints, it is obvious that other attachment means might be used, such as a threaded section between the coupling and the pipe. Therefore, the form of the invention as set out above should be considered as illustrative and not as limiting the scope of the following claims.

I claim:

1. In a pipe joint, a section of large diameter plain end resilient metallic pipe and a coupling comprising a resilient metallic one-piece tubular member adapted to receive an end of said pipe section, said tubular member having a wall thickness approximately equal to the wall thickness of the pipe and comprising a cylindrical portion having an inside diameter slightly larger than the outside diameter of the pipe, an annular wall portion projecting radially outwardly at an end of said cylindrical portion, a second cylindrical wall portion projecting axially from the outer periphery of said radial wall portion and a second annular wall portion projecting radially inwardly from the outer end of said second cylindrical portion, the inner peripheral edge of said second radial wall portion having a diameter slightly greater than the outside diameter of the pipe, said radial wall portions and second cylindrical wall portion together forming an annular inwardly-facing channel, an annular rubber gasket of approximately square cross section disposed in said channel and bearing on said first mentioned radial wall portion and second cylindrical wall portion, a gasket follower ring disposed between the gasket and said second radial wall portion, said second radial wall portion having a plurality of equally spaced tapped holes extending therethrough in an approximately axial direction, and a plurality of stud bolts threadedly engaged in said apertures and adapted to urge the follower ring axially toward the gasket to apply pressure to the gasket, the wall portions forming said channel being inherently resilient to maintain said pressure.

2. A pipe joint according to claim 1, in which the radial thickness of the gasket is substantially twice the wall thickness of said tubular member.

3. In a pipe joint, a section of large diameter plain end resilient metallic pipe and a coupling comprising a resilient metallic one-piece tubular member adapted to receive an end of said pipe section, said tubular member having a wall thickness approximately equal to the wall thickness of the pipe and comprising a cylindrical portion having an inside diameter slightly larger than the outside diameter of the pipe, an annular wall portion projecting radially outwardly at an end of said cylindrical portion, a second cylindrical wall portion projecting axially from the outer periphery of said radial wall portion and a second annular wall portion projecting radially inwardly from the outer end of said second cylindrical portion, the inner peripheral edge of said second radial wall portion having a diameter slightly greater than the outside diameter of the pipe, said radial wall portions and second cylindrical wall portion together forming an annular inwardly-facing channel, an annular rubber gasket of approximately square cross section disposed in said channel and bearing on said first mentioned radial wall portion and second cylindrical wall portion, a gasket follower ring disposed between the gasket and said second radial wall portion, said second radial wall portion having a plurality of equally spaced tapped holes extending therethrough in an approximately axial direction, and a plurality of stud bolts threadedly engaged in said apertures and adapted to urge the follower ring axially toward the gasket to apply pressure to the gasket, the wall portions forming said channel being inherently resilient to maintain said pressure, and the inner surface of said channel, at the junction of the first mentioned cylindrical wall portion and the first mentioned radial wall portion, being beveled to provide an annular gasket recess of wedge-shaped cross section between said surface and the pipe.

4. In a pipe joint, a section of large diameter plain end resilient metallic pipe and a coupling comprising a resilient metallic one-piece tubular member adapted to receive an end of said pipe section, said tubular member having a wall thickness approximately equal to the wall thickness of the pipe and comprising a cylindrical portion having an inside diameter slightly larger than the outside diameter of the pipe, an annular wall portion projecting radially outwardly at an end of said cylindrical portion, a second cylindrical wall portion projecting axially from the outer periphery of said radial wall portion and a second annular wall portion projecting radially inwardly from the outer end of said second cylindrical portion, the inner peripheral edge of said second radial wall portion having a diameter slightly greater than the outside diameter of the pipe, said radial wall portions and second cylindrical wall portion together forming an annular inwardly-facing channel, an annular rubber gasket of approximately square cross section disposed in said channel and bearing on said first mentioned radial wall portion and second cylindrical wall portion, a gasket follower ring disposed between the gasket and said second radial wall portion, said second radial wall portion having a plurality of equally spaced tapped holes extending therethrough in an approximately axial direction, and a plurality of stud bolts threadedly engaged in said apertures and adapted to urge the follower ring axially toward the gasket to apply pressure to the gasket, the wall portions forming said channel being inherently resilient to maintain said pressure, the inner surface of said channel formed by the inner face of the first mentioned radially projecting wall portion having an outer portion that is substantially perpendicular to the axis of said tubular member and co-operates with said follower ring to retain the gasket in said channel prior to positioning said coupling on a pipe and a beveled inner portion providing an annular gasket recess of wedge-shaped cross section between said beveled portion and the pipe when the coupling is in position on a pipe.

5. In a pipe joint, a section of large diameter plain end resilient metallic pipe and a coupling comprising a resilient metallic one-piece tubular member adapted to receive an end of said pipe section, said tubular member having a wall thickness approximately equal to the wall thickness of the pipe and comprising a cylindrical portion having an inside diameter slightly larger than the outside diameter of the pipe, an annular wall portion projecting radially outwardly at an end of said cylindrical portion, a second cylindrical wall portion projecting axially from the outer periphery of said radial wall portion and a second annular wall portion projecting radially inwardly from the outer end of said second cylindrical portion, the inner peripheral edge of said second radial wall portion having a diameter slightly greater than the outside diameter of the pipe, said radial wall portions and second cylindrical wall portion together forming an annular inwardly-facing channel, an annular rubber gasket of approximately square cross section disposed in said channel and bearing on said first mentioned radial wall portion and second cylindrical wall portion, a gasket follower ring disposed between the gasket and said second radial wall portion, said second radial wall portion having a plurality of equally spaced tapped holes extending therethrough in an approximately axial direction, and a plurality of stud bolts threadedly engaged in said apertures and adapted to urge the follower ring axially toward the gasket to apply pressure to the gasket, the wall portions forming said channel being inherently resilient to maintain said pressure, the follower ring being recessed on its outer surface to receive the inner ends of said stud bolts and the inner surface of the follower ring and adjacent surface of the gasket having interengaging projecting and recessed portions for positioning the follower ring and gasket in said channel and retaining said gasket in said channel prior to positioning said coupling on a pipe.

ROGER E. RISLEY.

References Cited in the file of this patent

UNITED STATES PATENTS

| Number | Name | Date |
|---|---|---|
| 784,416 | McDonald | Mar. 7, 1905 |
| 1,371,632 | Latimer | Mar. 15, 1921 |
| 1,588,444 | Carson | June 15, 1926 |
| 2,105,022 | Wilson et al. | Jan. 11, 1938 |
| 2,108,848 | Engel et al. | Feb. 22, 1938 |
| 2,145,645 | Byers | Jan. 31, 1939 |
| 2,197,450 | Curtis | Apr. 16, 1940 |
| 2,273,154 | Stromsoe | Feb. 17, 1942 |
| 2,445,151 | Newell | July 13, 1948 |
| 2,588,573 | Risley | Mar. 11, 1952 |

FOREIGN PATENTS

| Number | Country | Date |
|---|---|---|
| 39,091 | Netherlands | Sept. 15, 1936 |